Figure 1:
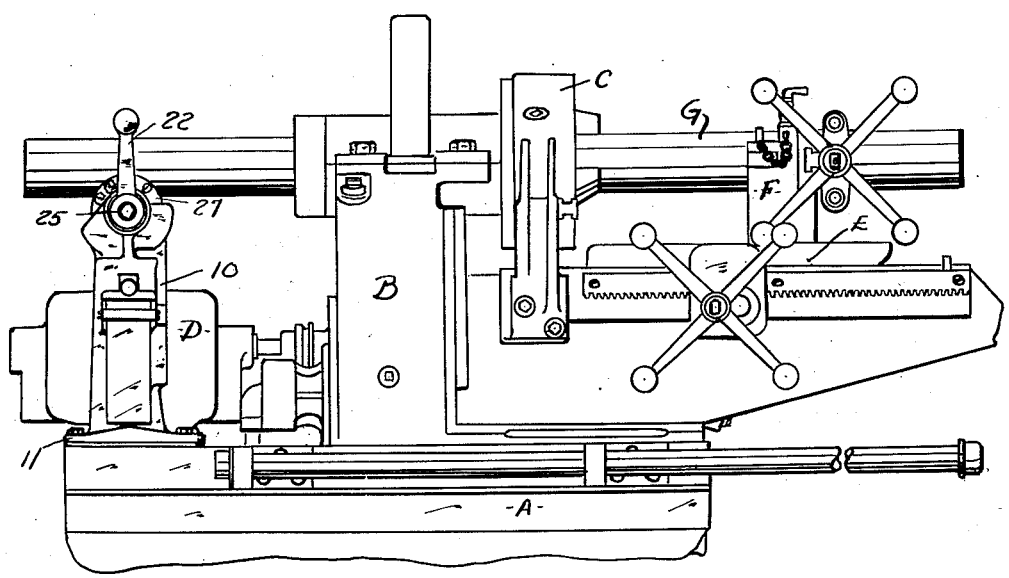

Dec. 11, 1951     C. W. SHAFER     2,578,321
PIPE REST

Filed Feb. 18, 1948     2 SHEETS—SHEET 1

INVENTOR.
CLARENCE W. SHAFER
BY
Bates, Teare & McBean
ATTORNEYS

Dec. 11, 1951 C. W. SHAFER 2,578,321
PIPE REST

Filed Feb. 18, 1948 2 SHEETS—SHEET 2

INVENTOR.
CLARENCE W. SHAFER
BY
Bates, Teare, & McBean
ATTORNEYS

UNITED STATES PATENT OFFICE 2,578,321

PIPE REST

Clarence W. Shafer, Warren, Ohio, assignor to Beaver Pipe Tools, Inc., Warren, Ohio, a corporation of Ohio Application February 18, 1948, Serial No. 9,260

2 Claims. (Cl. 10—107)

This invention relates to a device adapted to be associated with a pipe working machine to support extended pipes of various sizes as they are acted on in the machine. Such machines ordinarily have a hollow chuck adapted to grip an extended pipe and rotate it while a threading, cutting or reaming operation is performed on the pipe. As the pipe may extend a considerable distance in back of the chuck, it is important to have a suitable support, commonly known as a pipe rest, to prevent a whipping action of the extended pipe, and such supports must be adjusted vertically for different sizes of the pipe.

The object of the present invention is to provide such a support or pipe rest so designed that it may be very readily adjusted for pipes of different sizes and when set in any given position will effectively support such pipe during the operations thereon.

The invention is herein illustrated in connection with a conventional pipe working tool and its own characteristics are fully shown in the drawings and are hereinafter described in detail.

Figure 2:
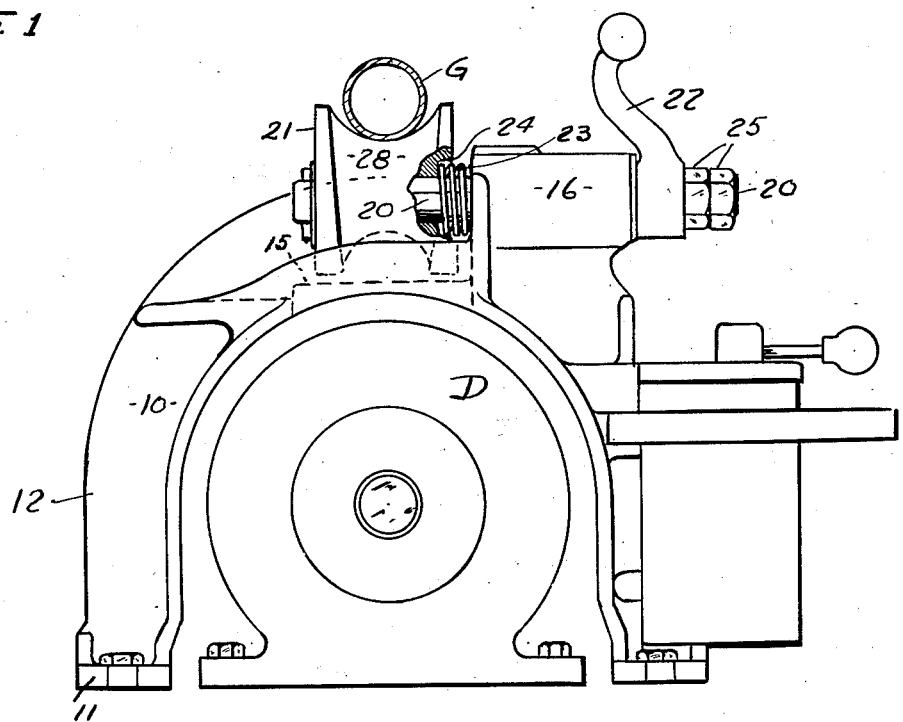
Figure 4:
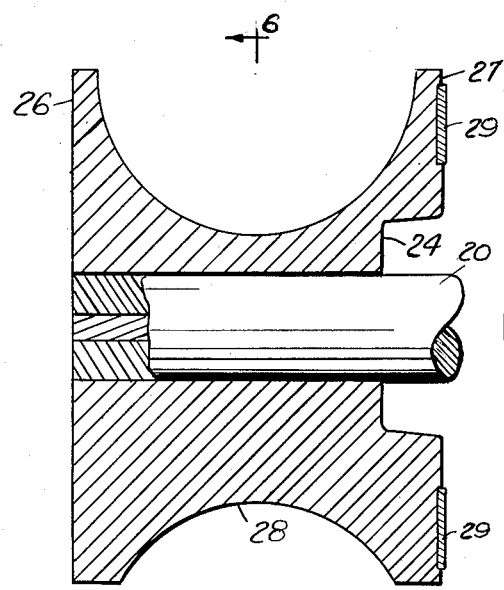
Figure 5:
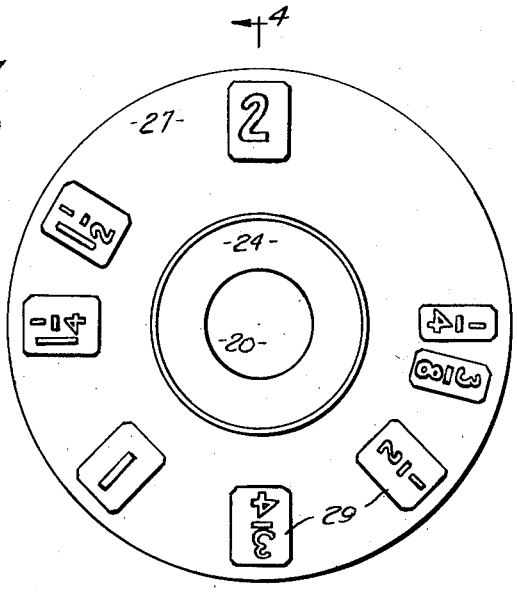
Figure 3:
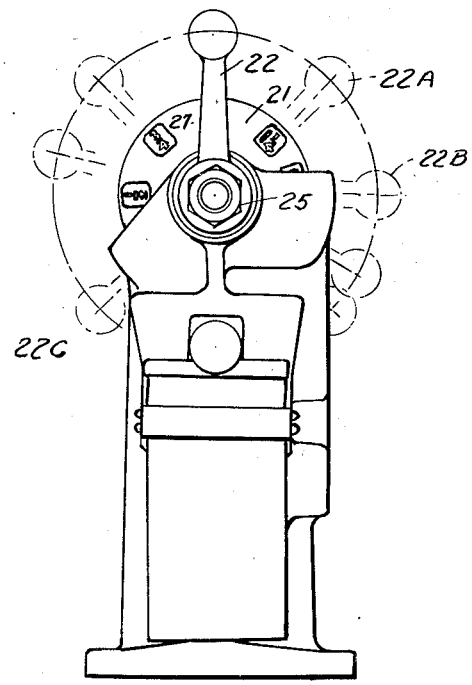
Figure 6:
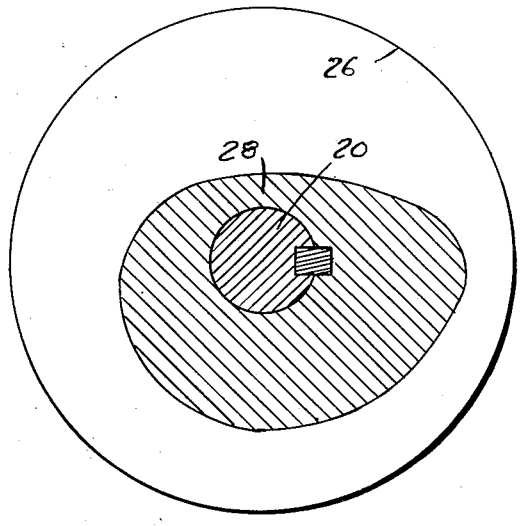

In the drawings, Fig. 1 is a side elevation of a pipe working machine equipped with my improved pipe rest; Fig. 2 is a side elevation of the pipe rest, in the nature of an end view of the machine looking at the left hand end in Fig. 1; Fig. 3 is a front or end view of the pipe rest; Fig. 4 is an axial section of the member of my pipe rest which engages the pipe; Fig. 5 is a face view of such member; Fig. 6 is a transverse central section thereof, as indicated by the line 6—6 on Fig. 4.

Referring first to Fig. 1, A indicates the bed of a pipe working machine; B an upstanding gear housing therein; C a rotary hollow chuck mounted in the standard, and D an electric motor connected with the chuck by reducing gearing (not shown) in the housing B. E indicates a carriage movable on the bed in a direction parallel with the chuck axis and carrying a suitable tool F (as a threading or cutting device) adapted to act on the pipe. The pipe itself is designated G.

My pipe rest adapted to engage the underside of the pipe in advance of the chuck is suitably carried by the machine bed A. As shown, the motor D for driving the chuck is centrally mounted on the bed directly beneath the pipe and the pipe rest is carried by an arch shaped frame 10 mounted on the bed and extending freely over the motor. This frame has suitable feet 11 by which it is bolted to the machine bed. The frame 10 is preferably a suitable casting having strengthening webs 12. As indicated in dotted lines it has an upwardly facing pocket 15 at its top, and, in front of this, it carries a tubular bearing 16.

Rotatably mounted in the bearing 16 is a shaft 20. On the inner end of this shaft keyed to it is an eccentric spool 21 and on the outer end of the shaft beyond the bearing is a handle 22, also keyed to the shaft. A coil spring 23 surrounds the shaft between the spool and bearing sleeve, and seats in a cavity 24 in the spool. This spring presses at opposite ends against the spool and against the bearing or against a washer engaging the bearing. Suitable nuts 25 screwing onto the end of the shaft 20 serve to compress the spring and thus maintain friction between the stationary parts and the revoluble parts carried by the shaft, so that the device will remain in whatever position is given it by the handle.

The spool 22 is of peculiar shape in that its edges are two circular discs 26 and 27, while the intermediate or body portion 28 considered circumferentially is a spiral cam. The body is curved transversely (that is longitudinally of the shaft) from its central region outwardly in each direction to the periphery of the edge discs.

It results from the eccentric construction of the spool that its top portion stands at various heights from the bottom of the support according to the position of the spool. Accordingly, the spool in one position may readily support, for instance, a 2″ pipe and in another position, where its body extends higher, a 1½″ pipe, etc. The spool in the drawings is designed to support all of the standard pipes between the range of ¼″ and 2″.

The curvature of the groove in successive axial planes could be on a gradually reducing radius as the radius on the cam body increases, to make the width of the groove at all points correspond approximately to the external diameter of the pipe to be supported. However, for simplicity of construction, I find it sufficient to make the groove of the same radius throughout, such radius being slightly larger than the external radius of the largest pipe to be supported. Thus for a spool to support pipes within the range mentioned, a radius of 1¼″ is quite satisfactory and results in some gradual inward thickening of the disc-like end portions of the spool as the radius of the spool body increases, as illustrated in the drawings hereof.

It will be seen that with my pipe rest, a mere turning of the handle from one direction to another will re-adjust the position of the supporting surface according to the size of the pipe desired and the friction provided by the spring will insure the spool remaining in that position during the operations on the pipe.

I place on the end of the spool next to the handle indications for different sizes of the pipe (preferably numerals designated 29) and I place a suitable cooperating mark as, for instance, an arrow on the top of the bearing for the shaft. To set the spool for any desired size of pipe, it is only necessary for the operator to grasp the handle and turn it in one direction or the other until the indication corresponding to the size registers with such stationary mark on the bearing.

In Fig. 3, I have shown the handle and spool in the position for a 1" pipe. A substantially 45° turn in the clockwise direction (bringing the handle into the position 22a) would bring the designation ¾ on the spool into the topmost position and locate the pipe rest for ¾" pipe. A 90° turn in the clockwise direction to 22b will position the pipe rest for a ½" pipe or a turn of approximately 135° in the counterclockwise direction to position 22c will locate the spool for a 2" pipe. The different positions of the handle for the various sizes of pipe are illustrated in broken lines in this figure.

It will be seen that my pipe rest may set almost instantly for any size of pipe within the range of the chuck of the machine with which the rest is associated. The setting being accomplished from the front of the machine is effected without any liability of injury to the operator's hands even if the pipe is in place and rotating at the time. The operator merely grasps the handle and turns it in one direction or the other until the numeral of the size desired appears opposite the indication on the top of the bearing. The friction is sufficient to hold the spool in this position notwithstanding movement of the pipe across it and accordingly the operator knows that the pipe is properly supported in alignment with the chuck. However, whenever the size of pipe is to be changed the re-setting of the spool to a new location is effected with equal ease and speed by the mere manipulation of the handle.

I claim:

1. In a pipe working machine having a frame, a pipe chuck rotatably supported thereby, a pipe support spaced from the chuck and having a pipe supporting surface, said support comprising a spool having a continuous circumferential spiral groove extending into its periphery and the base of which groove has an annular portion which recedes relative to the axis of the spool, means to rotatably support said spool on said frame with its axis normal to the axis of the chuck and with its groove in alignment with a vertical plane passing through the chuck axis, means to rotate said spool, said means comprising a manually operable lever, and friction means to retain said spool in an adjusted position about its axis.

2. In a pipe working machine having a frame, a pipe chuck rotatably supported thereby, a pipe support spaced from the chuck and having a pipe supporting surface, said support comprising a spool having a continuous circumferential spiral groove extending into its periphery and the base of which groove recedes relative to the axis of the spool for an extent of about three quarters of the periphery of the spool, said groove being substantially the same width at the periphery of the spool throughout said extent, said groove being in the form of a compound curve throughout said extent, means to rotatably support said spool on said frame with its axis normal to the axis of the chuck and its groove in alignment with a vertical plane passing through the chuck axis, means to rotate said spool, and friction means to retain said spool in an adjusted position about its axis.

CLARENCE W. SHAFER.

REFERENCES CITED

The following references are of record in the file of this patent:

UNITED STATES PATENTS

| Number | Name | Date |
| --- | --- | --- |
| 154,699 | McFarland | Sept. 1, 1874 |
| 443,847 | Ewald | Dec. 30, 1890 |
| 913,520 | Lassiter | Feb. 23, 1909 |
| 2,021,686 | Gassen | Nov. 19, 1935 |
| 2,050,048 | Findlater | Aug. 14, 1935 |
| 2,055,908 | Pealer | Sept. 29, 1936 |
| 2,101,766 | Walter | Dec. 7, 1937 |

FOREIGN PATENTS

| Number | Country | Date |
| --- | --- | --- |
| 501,184 | Great Britain | Feb. 22, 1939 |